Aug. 13, 1963
B. F. MONROE
3,100,669
RETRACTABLE BELT
Filed Sept. 25, 1961
3 Sheets-Sheet 1
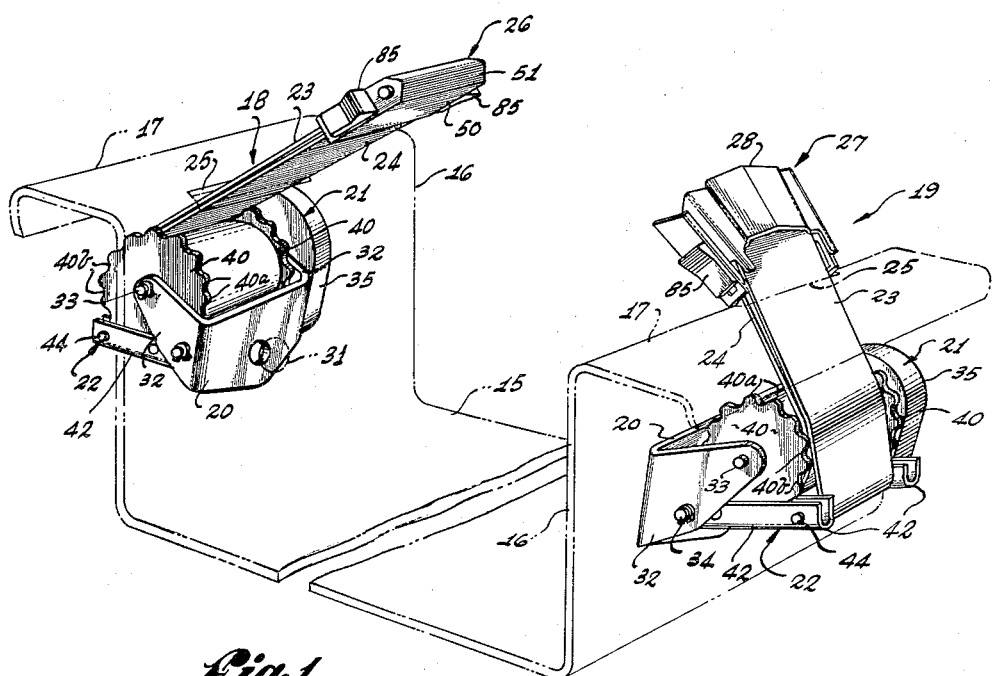
Fig. 1
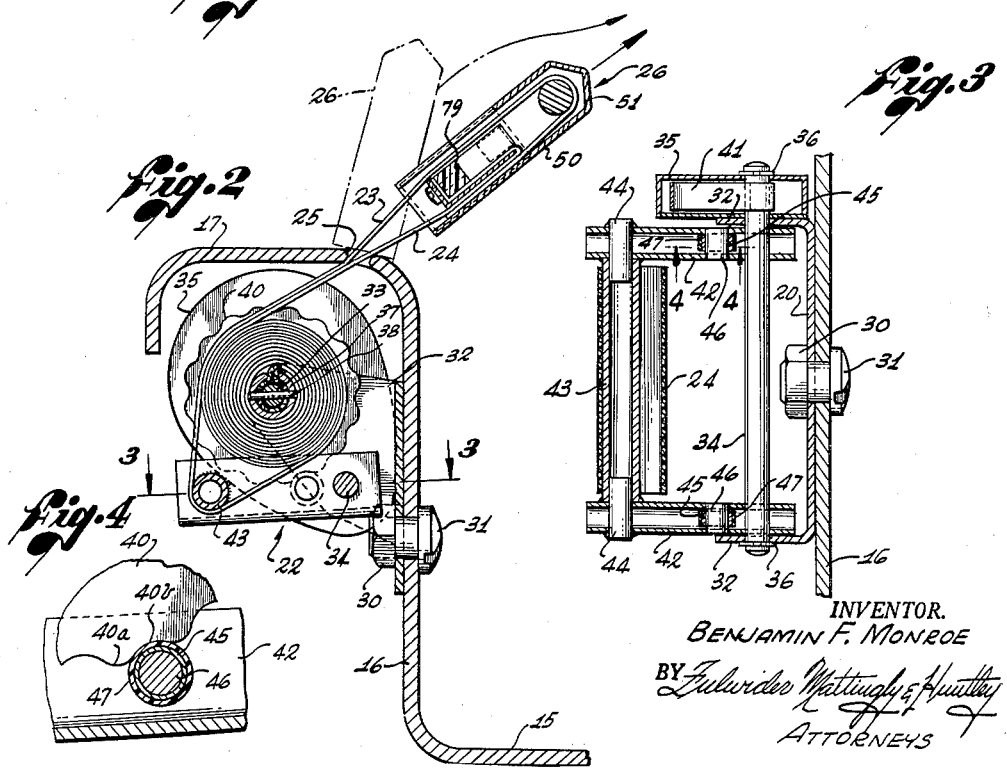
Fig. 2
Fig. 3
Fig. 4
INVENTOR.
BENJAMIN F. MONROE
BY *Fulwider Mattingly & Huntley*
ATTORNEYS Aug. 13, 1963
B. F. MONROE
3,100,669
RETRACTABLE BELT
Filed Sept. 25, 1961
3 Sheets-Sheet 2
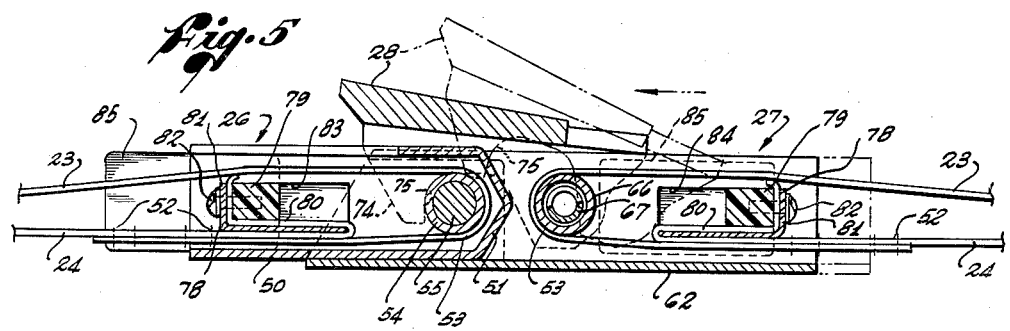
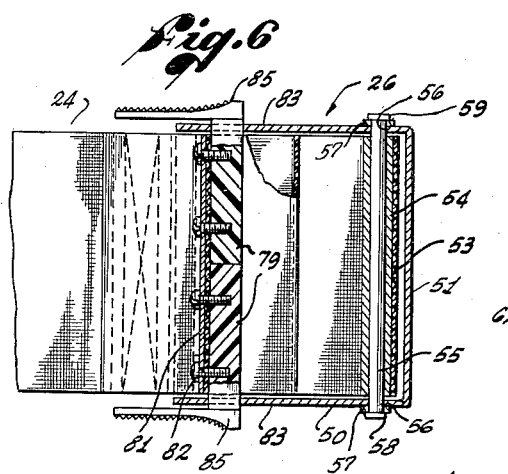
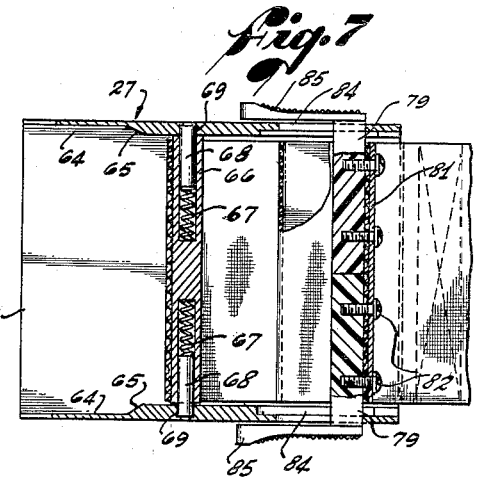
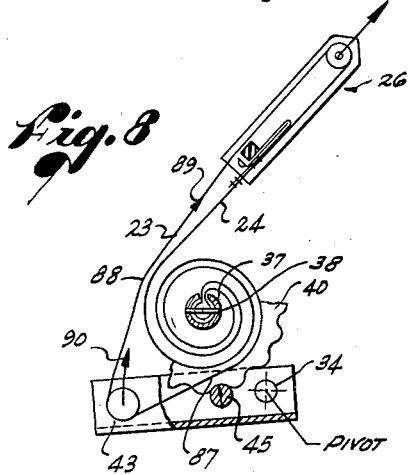
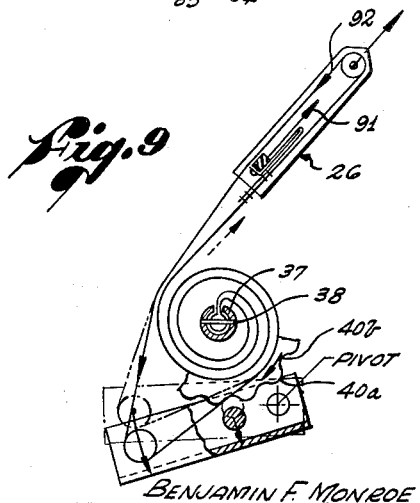
BENJAMIN F. MONROE
BY
Lulwider Mattingly & Huntley
ATTORNEYS Aug. 13, 1963   B. F. MONROE   3,100,669
RETRACTABLE BELT
Filed Sept. 25, 1961   3 Sheets-Sheet 3

INVENTOR.
BENJAMIN F. MONROE
BY Fulwider Mattingly & Huntley
ATTORNEYS

United States Patent Office 3,100,669
Patented Aug. 13, 1963

3,100,669
RETRACTABLE BELT
Benjamin F. Monroe, 1734 Benedict, Canyon Drive,
Beverly Hills, Calif.
Filed Sept. 25, 1961, Ser. No. 140,600
17 Claims. (Cl. 297—388)

The present invention relates generally to restraining belts, and more particularly, to retractable belts for restraining persons or cargo safely in place during transportation by aircraft, motor vehicles and otherwise.

My invention can be used in situations where it is desired to prevent a person or object from being shifted out of or away from a supporting surface. The field of aircraft passenger safety belts is perhaps the most critical and demanding and a waist belt has been chosen to illustrate a presently preferred embodiment in order to demonstrate the many advantages of the invention. However, the invention is adaptable to use in shoulder harnesses as well as waist belts and it is to be understood that the invention can equally well be employed in other types of conveyances and for the restraining of cargo as well as passengers.

An object of my invention is to provide a normally retracted belt that is easily extendible around the person or object to be secured in place and which, after the interconnection of the buckle elements, automatically retracts and closes to adjust itself to the girth of the person or object being restrained.

Another important object of the invention is to provide an extendible and automatically retractable belt that snugly adjusts itself to the size or girth of the person or objects being restrained, but which, in the event of any shifting or tendency towards displacement of the person or object from the supporting surface, will automatically lock itself to prevent the person or object being thrown out of place.

Yet another object of the invention is to provide a retractable belt comprising an inner and outer pair of straps coiled upon the same reel and having their outer ends carried by the same buckle element. With this arrangement, a much thinner and lighter material may be employed for either or both of the straps without sacrificing strength and, as both the thin inner and outer straps are concurrently retracted or extended from the same reel, the number of revolutions of the reel can be held to a minimum so as to permit the use of a more efficient and durable spring for the retracting mechanism.

It is also an object of my invention to provide a double strap safety belt mechanism in which both of the straps can be extended by exerting tension on the inner strap alone but in which, after the belt is in operative position, any tension on the outer strap causes positive locking of the mechanism against any additional extension.

The invention also has for an object the provision of a retractable belt mechanism of this type which, if desired, need not rely on any spring means for holding a latching means out of contact with the windup reel to permit extension of the straps. In this connection, the latching mechanism may have substantially continuous contact with the reel and yet be practically noiseless in operation and positive in locking the reel.

The foregoing and other objects and advantages of my invention will be apparent from the following description, when taken in conjunction with the annexed drawings illustrating a presently preferred embodiment of my invention, as adapted for aircraft passenger seat use.

FIGURE 1 is a perspective view of a pair of retractable belts embodying my invention, mounted in cooperative relationship on a schematically indicated passenger space.

FIGURE 2 is a vertical sectional view taken approximately midway of the axis of the reel of the left hand mechanism illustrated in FIGURE 1.

FIGURE 3 is a sectional view taken on the line 3—3 of FIGURE 2.

FIGURE 4 is a sectional view taken on the line 4—4 of FIGURE 3, but on a larger scale.

FIGURE 5 is a sectional view taken in a substantially vertical plane and longitudinally of an inter-connected pair of buckle elements.

FIGURE 6 is a sectional view taken through the median plane of the left hand buckle element shown in FIGURE 5.

FIGURE 7 is a sectional view taken along the median plane of the right hand buckle element shown in FIGURE 5.

FIGURE 8 is a schematic elevational illustration of the left hand retractable belt shown in FIGURE 1, particularly illustrating the mode of operation of the mechanism in locking the reel to prevent further extension of the belt.

FIGURE 9 is a view similar to FIGURE 8, but illustrating the mode of operation of the mechanism in permitting extension of the belt.

Figure 10:
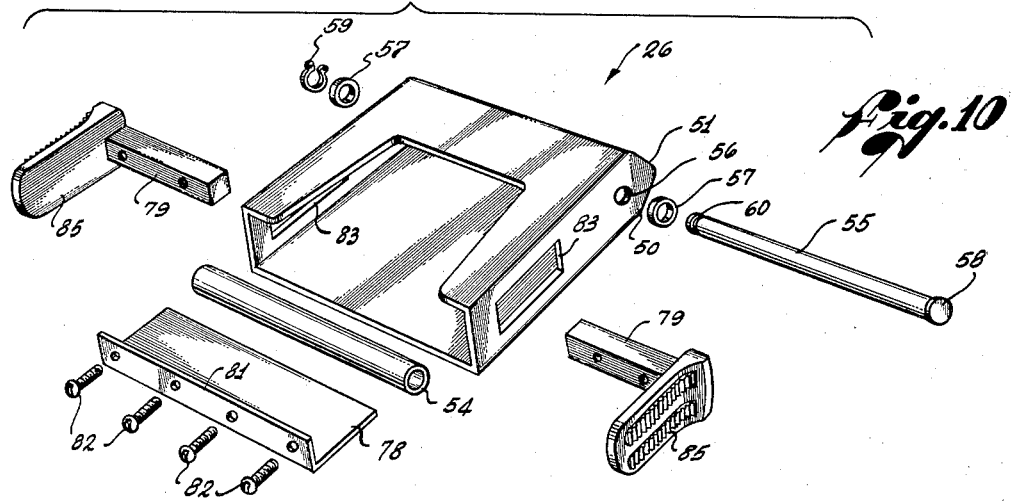
FIGURE 10 is an exploded perspective view of the several parts of the plain end buckle element.
Figure 11:
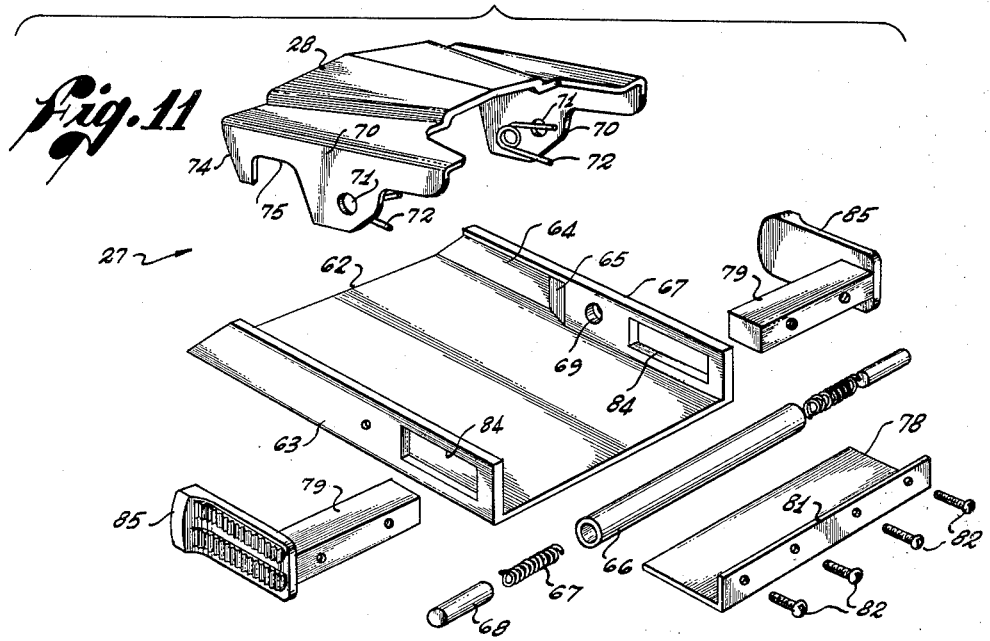
FIGURE 11 is an exploded perspective view of the several parts of a buckle element incorporating a latch for connection to a plain end buckle element.

Referring to the drawings for the general arrangement of the invention, and particularly referring to FIGURE 1, a seat 15 is indicated schematically, having opposite sides 16 with arm rests 17 formed at their upper edges. A cooperating pair of belt assemblies 18 and 19 are mounted at opposite sides of the seat 15 as, for example, on the side walls 16. It will, of course, be understood that the belt assemblies 18 and 19 could be otherwise mounted as, for example, to the floor or chassis of a motor vehicle, if used as an automobile seat belt.

The belt assemblies 18 and 19 are similar to one another, both employing a mounting bracket 20 supporting both a windup reel assembly 21 and an automatically actuated locking means 22. The belts preferably, but not necessarily, take the form of a single piece of nylon webbing, or the like, which is doubled to provide an outer strap 23 and an inner strap 24. The inner ends of the two straps 23 and 24 are connected to the rotor of the reel assembly 21, which is spring actuated for coiling both straps onto the reel.

The straps 23 and 24 are retractable and extendible through a suitable opening 25 formed in the arm rest 17. The belt assembly 18 has a plain end buckle assembly 26 mounting the outer ends of both straps 23 and 24 and, similarly, the belt assembly 19 has buckle assembly 27 carrying the outer ends of its straps 23 and 24. Additionally, the buckle assembly 27 mounts a latch 28 for securing the buckle elements 26 and 27 together when in use. When the buckle elements 26 and 27 are unlatched, the straps 23 and 24 and their associated buckle assemblies are retracted by the windup reel assembly 21 until the buckle assemblies are seated on the arm rests 17, in the manner indicated in phantom outline for the buckle assembly 26 in FIGURE 2.

The locking means 22 contacts the reel assembly 21 to prevent unwinding movement of the straps 23 and 24 whenever tension is present in the outer strap 23. The buckle assemblies 26 and 27 are provided with means for pulling on the inner straps 24, without inducing tension of the outer straps 23, whereby the straps of both belt assemblies 18 and 19 may be extended, to permit latching together of the buckle assemblies.

More particularly, the bracket 20 may be secured in place by any suitable means as, for example, by a nut 30 and bolt 31 passing through suitable bores formed in the web of the bracket and the seat wall 16. The bracket 20 is U-shaped in configuration, having a pair of opposite side walls 32 between which both the reel assembly 21 and locking means 22 are supported. The former is supported on a rotor shaft 33 that is journaled in a pair of aligned bores formed in the pair of walls 32, at the outermost ends of the walls. The locking means is mounted on a pivot shaft 34 that is parallel to the shaft 33, but supported more closely to the web of the bracket 20, through another pair of aligned bores formed in the bracket side walls 32. As is shown in FIGURE 3, the pivot shaft 34 extends outwardly beyond one wall of the bracket and through opposite side walls of a spring housing 35. The pivot shaft is held against axial displacement by a pair of snap rings 36 secured to the protruding opposite ends of the shaft. Although not shown, it is to be understood that the rotor shaft 33 similarly extends beyond the same wall of the bracket 20 and through the opposite side walls of the spring housing 35 and is also held against axial displacement by snap rings. Accordingly, the spring housing 35 is supported on the protruding ends of the shafts 33 and 34 and against the adjacent wall 32 of the bracket 20.

While the straps 23 and 24 may be separate pieces of substantially inelastic belting or webbing, I prefer to make them from a single length of material, folded at about its midpoint to define the inner and outer straps. The bight thus formed in the single piece of material is supported on the rotor shaft 33 and is, in turn, enclosed by a longitudinally slotted sleeve 37. The outer strap 23 and inner strap 24 extend out of the slot of the sleeve 37 to be wound on the reel. The sleeve 37, the bight portion of the strap material, and the rotor shaft 33 are keyed together by a suitable pin 38, extending diametrically through the assembly.

A pair of disks 40 are coaxially keyed to the rotor shaft 33, at opposite ends of the coil of strap material. The end portion of the rotor shaft 33 disposed within the spring housing 35 is drivably engaged by the inner end of a clock spring 41 and the outer end of this spring is fastened to the end portion of the pivot shaft 34 disposed in the spring housing 35 (see FIGURE 3). It will, of course, be understood that extension of the straps 23 and 24 effects rotation of the rotor 33 to wind up the clock spring 41, so that the spring 41 at all times tends to retract the straps 23 and 24.

The locking means 22 comprises a parallel pair of narrow channels 42 having inner ends pivotally supported on the shaft 34. The outer ends of the channels 42 are rigidly interconnected by a tubular countershaft 43, spanning the space between the channels 42 and indexed in parallel relationship to the shaft 34 and rotor shaft 33 by a pair of pins 44 fixed in the walls of the channels 42. As is shown in FIGURE 1, the channels 42 are positioned and arranged to receive peripheral portions of the rotatable disks 40. Within each channel 42, a suitable brake device is positioned between the countershaft 43 and shaft 34, for engagement with the periphery of a disk 40. While this brake may be a pawl, I prefer a latching roller taking the form of a sleeve 45 rotatably mounted on a short shaft 46 affixed between the opposite side walls of the channel 42, the sleeve being covered with a rubber sheath 47 for noiseless operation. With latching rollers as brakes, the disks 40 are preferably formed with scroll edges defining crests 40a and roots 40b, the root sections providing positive locking seats for the rollers.

As is indicated in FIGURE 5, the outer ends of the straps 23 and 24 of both assemblies 18 and 19 are similarly attached to both buckle assemblies 26 and 27. However, the buckle assemblies have different configurations in order to be capable of coupling and to accommodate the latch 28 on the buckle assembly 27.

Referring to FIGURE 10, the buckle assembly 26 includes a box-like body shell 50 that is closed at its forward end by a tapered nose section 51. Referring for a moment to FIGURE 5, it will be seen that the free ends of the straps 23 and 24 are securely stitched together, as indicated at 52, so that the outer ends of the straps define a bight 53. In the buckle assembly 26, the bight 53 is supported on a sleeve 54 that is rotatably mounted within the nose section 51 of the shell 50 on a shaft 55, the shaft being journaled in a suitable pair of coaxially aligned bores 56 formed in opposite side walls of the shell 50. The shaft 55 protrudes outwardly beyond both of the opposite side walls of the body shell 50 and on opposite ends, outside of the shell 50, rotatably supports a pair of rollers 57. An enlarged head 58, formed at one end of the shaft 55, serves to retain the adjacent roller 57 on the shaft end, at the other end of the shaft, the other roller 57 is retained by a snap ring 59, engageable in a suitable circumferential groove 60 formed in the corresponding end of the shaft 55.

The other buckle assembly 27 has a channel shaped body 62, including opposite side walls 63. At the forward end of the body 62, the interior surfaces of the opposite side walls 63 are undercut to form grooves 64 terminating at their inner ends in shoulders 65. The grooves 64 serve to guide the body shell 50 of the buckle assembly 26 into the buckle assembly 27. For supporting the bight 53 of the straps 23 and 24 associated with the buckle assembly 27, the body 62 rotatably supports a roller 66 between the side walls 63. The opposite ends of the roller 66 are formed with blind bores serving as pockets for a pair of coil springs 67 and for a pair of pins 68 and the opposite side walls 63 of the body 62 are formed with aligned counterbores 69, into which the support pins 68 are biased.

The latch 28 is also pivotally supported on the roller 66, having a pair of opposite side walls 70 formed with an aligned pair of bores 71 through which the roller passes. A pair of hair springs 72 are coiled around the pair of roller pins 68, just inside of the latch sidewalls 70, and serve to bias the latch 28 into latching position.

The leading edges 74 of the latch side walls 70 have a cam configuration and are engageable by the rollers 57 of the buckle assembly 26, when the shell 50 is inserted into the body 62. The cam edges 74 are adapted to lift the latch 28 to the dotted outline position shown in FIGURE 5, in response to this contact by the rollers 57. As the buckle assembly 26 is pushed farther into the buckle assembly 27, the rollers 57 advance until they register with a pair of detents 75 formed in the opposite side walls 70 of the latch 28. The pair of springs 72 then bias the latch into latching positions whereby the rollers 57 are locked in the detents 75, until such time as the latch 28 is manually lifted.

For extending the belts, both buckle assemblies 26 and 27 have a means for pulling on the inner strap 24, while slackening tension on the outer strap 23. In both buckle assemblies, this means preferably takes the form of an angularly shaped plate 78 which nestingly receives and holds together a bar assembly having an identical pair of members 79, with an end of one of the straps 23 or 24 sandwiched between the plate and bar assembly. In the illustrated embodiment of the invention, and as best seen in FIGURE 5, the inner and outer straps 24 and 23 are joined by the stitching 52 with a free end 80 of the strap 24 left over. The plate 78 has a right angle flange 81 bent up from the body of the plate and the end 80 of the strap 24 is reversely folded to extend over the top of the body of the plate and then is held in place against the forwardly facing surface of the flange 81 by the pair of members 79. The plate 78, strap end 80, and members 79 are secured together by a plurality of fasteners 82, each of which extends through the flange 81, through the extreme end portion of the strap end 80, and into one or the other of the pair of members 79.

The opposite side walls of the shell 50 are formed with a pair of longitudinally elongated slots 83 and the body 62 has its opposite side walls 63 similarly formed with a pair of elongated slots 84. Each bar assembly for each of the buckle assemblies is slidable longitudinally of its buckle assembly in the slots 83 or 84, as the case may be, and an end of each of the pair of members 79 extends sidewardly beyond the side wall of the member in which it is mounted to support a finger hold member 85. The members 79 are preferably keyed against angular movement in the slots 83 or 84, as by being rectangular in cross-sectional configuration, whereby the body of the plate 78 is maintained in parallel relationship to the strap on which it pulls and will not interfere with the other strap.

When both the outer and inner straps 23 and 24 are in retracted positions, as in FIGURE 2, with the major portions of their lengths coiled on the reel assembly 21, the outer strap has a longer length, as a function of the average diameter of the coiled straps, the webbing thickness and the number of turns in the coil. It should be noted that the outer strap 23 initially leaves the reel assembly 21 at a tangent point 87 just above the locking roller 45, is then trained around the counter shaft 43 and then proceeds to another tangent point 88 where it rejoins the inner strap 24. Referring to FIGURE 8, when tension is present in the outer strap 23, indicated by the directional arrow 89, the locking assembly 22 and, particularly, the counter shaft 43 is pivoted upwardly, as indicated by the directional arrow 90. The locking rollers 45 are thus forcefully brought into contact with the periphery of the disks 40 and, when the rollers fall into root sections of the scroll edges, the reel assembly 21 is locked against further extension of the straps 23 and 24. Due to the length of the lever provided by the distance between the countershaft 43 and the pivot shaft 34 of the locking assembly 21, a great force is exerted radially inwardly on the disks 40 so that a positive lock is secured.

In order to extend the belt assembly 18 or 19, as the case may be, the inner strap 24 is pulled by grasping the pair of finger members 85 and then pulling outwardly. Because of the slots 83 or 84, there is a degree of lost motion of the bars 79 relative to the buckle elements. Referring to FIGURE 9, a pulling force on the finger bar assembly is indicated by the directional arrow 91, this force being transmitted to the inner strap 24 through the plate 78. To the extent of the lost motion permitted by the slots 83 or 84, the pulling force 91 causes counter clockwise movement of the bight 53 in the buckle element, as viewed in FIGURE 9, thereby inducing slack in the outer strap 23, this slack being indicated by the directional arrow 92. As the finger bar assembly approaches or contacts the forward end of the slot 83 or 84, the reel assembly 21 is forced into unwinding rotation against the force of the retracting spring 41. Thus, both the relatively slack outer strap 23 and tensioned inner strap 24 extend outwardly from their mutual contact at the tangent point 88. However, as both straps pass the tangent point 87, the uncoiled length of the outer strap 23 becomes progressively longer than the inner strap 24, due to the longer coiled length of the outer strap 23 and, also, because of its additional progression around the countershaft 43. Accordingly, so long as a pulling force is exerted on the inner strap 24, while slack is present in the outer strap, both straps 23 and 24 can be extended until the buckle assemblies 26 and 27 are ultimately latched together. After latching of the buckle assemblies, release of the pulling force on the inner straps 24 of both buckle assemblies will allow both belt assemblies 18 and 19 to be retracted by the springs 41 into a comfortable, but snug, engagement with the person or object secured in the passenger or cargo space.

It will be observed in FIGURE 9 that the springless locking assembly 22 is indicated in both locking and unlocked positions. The locking assembly will tend to oscillate between these positions, but without actually locking, so long as the extending or pulling force 91 is applied, the latching rollers 45 tending to ride the crests and roots of the scroll disks 40.

Whenever the person or object which it is desired to restrain tends to be displaced, sufficient tension will be induced in the straps 23, in excess of the tension caused by the retracting of spring 41, to cause locking engagement of the latching rollers 45 and disks 40. As will appear from an examination of FIGURE 5, any tendency at separation of the latched buckle elements 26 and 27 will immediately be sensed on the bights 53 of both belt assemblies. Any slack in the outer strap will be taken up, locking tension will thus be induced in both straps 23 and 24 of both assemblies, and the tension of the outer straps 23 will at once activate the locking means 22.

In order to release the interconnected belt assemblies 18 and 19, the latch 28 need only be lifted after which the retracting spring 41 in both assemblies will effect automatic retraction of the belts.

Figure 12:
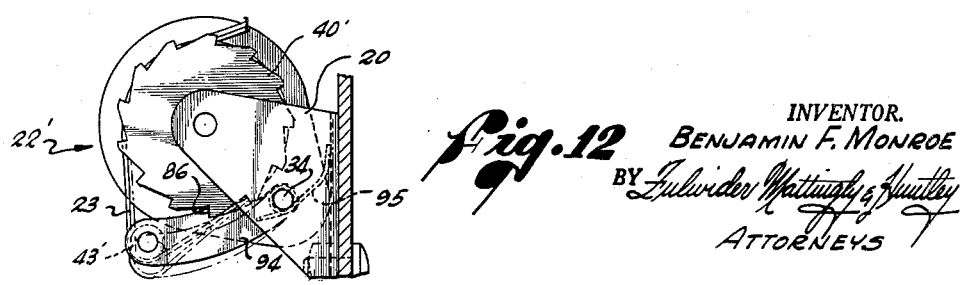
FIGURE 12 is an elevational view illustrating an alternative form of reel latching mechanism.

An alternative form of locking means 22' is shown in FIGURE 12. In this case, the reel assembly includes a pair of toothed ratchet disks 40' and the locking means takes the form of a pair of pawls 94, both of which are pivoted at inner ends on the pivot shaft 34. A countershaft 43' rigidly interconnects the outer ends of the pawls 94 for co-movement and has the outer strap 23 trained therearound, as before. A torsion spring 95 is coiled around the pivot shaft 34 and has one end engaged with the web of the bracket 20 and its other end connected to one of the pawls 94 for normally biasing both pawls 94 out of engagement with the ratchet disks 40'. The spring 95 is strong enough to insure sufficient clearance between the pawls 94 and the teeth of ratchet disks 40', so long as pulling force is exerted on the inner strap 24, but the spring does not have sufficient force to oppose locking tension exerted in the outer strap 23.

While my invention has been illustrated and described with reference to what is now regarded as the preferred embodiment, the construction is, of course, subject to modification. Therefore, I do not wish to be restricted to the particular details hereinabove set forth, but desire to cover all modifications falling within the spirit and scope of the following claims.

I claim:

1. In a retractable belt, a reel, a strap coiled on said reel, locking means mounted adjacent said reel for movement into locking engagement with said reel to prevent rotation of said reel in a direction permitting unreeling of said strap from said reel, and a member carried by said locking means and over which said strap is trained to move said locking means into engagement with said reel in response to tension in said outer strap.

2. A retractable belt comprising, a reel, inner and outer straps coiled on said reel, locking means mounted adjacent said reel for movement into locking engagement with said reel to prevent rotation of said reel, and a member carried by said locking means and over which said outer strap is trained to move said locking means into engagement with said reel in response to tension on said outer strap.

3. A retractable belt comprising, a reel, inner and outer straps coiled on said reel, a means for uncoiling both of said straps from said reel by pulling on said inner strap, and means responsive to tension in said outer strap for locking said reel against unwinding rotation.

4. A retractable belt comprising, a reel, inner and outer straps coiled on said reel, a member connected to said inner strap for uncoiling both of said straps from said reel by pulling on said inner strap, and locking means mounted adjacent said reel and engaged by said outer strap for movement into engagement with said reel to prevent unwinding rotation of said reel when said outer strap is under tension.

5. A retractable belt comprising, a rotatable reel, inner and outer straps having an end connected to said reel for coiling and uncoiling when said reel rotates, and locking means mounted adjacent said reel and engaged by said outer strap and arranged to be moved, in response to tension in said outer strap, into engagement with said reel to prevent unwinding rotation of said reel.

6. A retractable belt comprising, a reel, inner and outer straps coiled on said reel, a buckle element carrying outer ends of both of said straps, means on said buckle element for pulling on said inner strap to unwind both of said straps from said reel, and locking means mounted adjacent said reel and engaged by said outer strap and arranged to be moved, in response to tension in said outer strap, into engagement with said reel to prevent unwinding rotation of said reel.

7. A retractable belt comprising, a reel, inner and outer straps coiled on said reel, a disk secured to and extending radially from said reel, a member mounted for movement into contact with said disk in response to tension in said outer strap, said disk and member being adapted to prevent unwinding rotation of said reel when in contact with one another, and a buckle element carrying outer ends of both said straps for unwinding both said straps by pulling on said inner strap.

8. A retractable belt comprising, a reel, inner and outer straps coiled on said reel, a disk coaxially affixed to said reel for co-movement with said reel, a lever pivotally mounted adjacent said reel and arranged for movement of the free end of said lever towards said disk, and a member carried by said reel having said outer strap engaged with the opposite side of said member from said reel for moving said member and lever towards said reel and disk in response to tension in said outer strap, said lever having a portion engageable with said disk to stop unwinding rotation of said reel with a force proportional to the tension in said outer strap.

9. A retractable belt as set forth in claim 8 in which said disk has a peripheral edge of scroll configuration and in which said portion of said lever comprises a latching roller for rolling contact with crest and root sections of said scroll edge, said roller when engaged with a root section locking said reel against rotation when said outer strap is under tension.

10. A retractable belt as set forth in claim 8 in which said disk comprises a toothed ratchet wheel and in which said lever comprises a pawl engageable with teeth of said ratchet wheel, said pawl being normally biased out of contact with said ratchet wheel by a means adapted to yield to the presence of a predetermined tensile stress in said outer strap to permit movement of said pawl into locking engagement with said ratchet wheel to prevent unwinding rotation of said reel.

11. In a retractable belt, a bracket, a reel rotatably mounted in said bracket, inner and outer straps having an end connected to said reel for unwinding and winding when said reel rotates, spring means for normally biasing said reel in a direction to wind said straps onto said reel, a pair of disks coaxially affixed to said reel at opposite sides of said straps, a pair of levers having a common pivot axis on said bracket, a countershaft rigidly interconnecting swingable ends of said levers for co-movement, said levers being arranged for movement towards and away from contact with peripheral edges of said pair of disks and said countershaft having said outer strap trained around the side of said countershaft opposite said reel, and means carried by each of said levers at a portion intermediate said pivot axis and said countershaft and that forcefully contacts the edge of one of said disks when tension is present in said outer strap and adapted to prevent unwinding rotation of said reel with a force proportional to the force of said tension.

12. A retractable belt comprising, a reel, inner and outer straps having an end fastened to said reel for winding and unwinding when said reel rotates, spring means for normally biasing said reel in a direction to wind said straps onto said reel, a buckle element mounting the outer end of said inner and outer straps, a member connected to the outer end of said inner strap and mounted in said buckle element and adapted for pulling on said inner strap to unwind said inner and outer strap from said reel, and locking means mounted adjacent said reel for preventing unwinding of said straps in response to tension in said outer strap.

13. A retractable reel as set forth in claim 12 in which said straps are fastened together to define a bight and said buckle element has a support for said bight and in which said member for pulling on said inner strap is mounted on said buckle element adjacent said bight for limited movement, relative to said buckle element, in a direction extended longitudinally of said inner strap, said member having finger engageable portions by which to move said member towards said bight to pull on said inner strap for unwinding said straps from said reel, said inner strap when pulled effecting limited movement of said member towards said bight to pass a portion of said bight into said outer strap to slacken tension in said outer strap during unwinding of said strap from said reel.

14. A retractable belt as set forth in claim 12 in which said locking means comprises a pair of disks coaxially affixed to said reel at opposite sides of said straps, a pair of levers mounted in alignment with said pair of disks and having a common pivot axis, a countershaft rigidly interconnecting swingable ends of said levers for co-movement, said levers being arranged for movement and towards and away from contact with peripheral edges of said pair of disks and said countershaft having said outer strap trained around the side of said countershaft opposite to said reel, and means carried by each of said levers at a portion intermediate said pivot axis and said countershaft and that forcefully contacts the edge of one of said disks when tension is present in said outer strap and adapted to prevent unwinding rotation of said reel with a force proportional to said tension.

15. A restraining apparatus comprising, a pair of brackets to be mounted in spaced relationship, a rotatable reel mounted in each of said brackets, a pair of inner and outer straps for each of said reels having inner ends connected to said reels, spring means on each of said reels to normally bias said reel in a direction to wind said straps onto said reel, a buckle for each of said pair of straps and connected to the outer ends of both said inner and said outer straps, a latch mounted on one of said buckles for releasably interconnecting said buckles after said pair of buckles have been pulled together to unwind said pair of straps from said reels, said buckles, when interconnected by said latch, preventing rewinding of said pairs of straps onto said reels after slack in said pairs of straps has been taken up by said spring means, and locking means for each of said reels to lock said reel against unwinding rotation in response to tension in said outer straps.

16. An apparatus as set forth in claim 15 in which each of said buckles slidably mounts a member for limited movement in a direction longitudinally of said straps, said member extending transversely of said straps through and beyond a pair of opposite side walls of said buckles to mount a pair of finger engageable members on opposite ends of said member exteriorly of said buckle, said member within said buckle being connected to said inner strap by means including a flat plate extending forwardly from said member in substantially parallel relationship to said inner strap, said plate having its forward edge drivingly connected to said inner strap, said member being held by said buckle against angular movement whereby to maintain said plate substantially parallel to said strap when said member is moved longitudinally of said strap.

17. An apparatus as set forth in claim 15 in which said locking means for each of said reels comprises a pair of disks coaxially affixed to said reel at opposite sides of said pair of straps, each of said disks having a peripheral edge of scroll configuration, a pair of channel-shaped levers having a common pivot axis on said bracket, a countershaft rigidly interconnecting swingable ends of said pair of levers and having said outer strap of said pair of straps trained around the side of said countershaft opposite to said reel, said pair of levers being arranged to receive edge portion of said pair of disks between opposite side walls of said channel shaped levers, and a pair of latching rollers, each of which is mounted within one of said levers at a position intermediate said pivot axis and said countershaft for rolling contact with crest and root sections of said scroll edge of said disks, said roller when engaged with a root section locking said reel against unwinding rotation when said outer strap is under tension.

References Cited in the file of this patent

UNITED STATES PATENTS

| | | |
|---|---|---|
| 360,399 | Worden | Mar. 29, 1887 |
| 2,725,097 | Thoreson | Nov. 29, 1955 |
| 2,814,504 | Campbell | Nov. 26, 1957 |